United States Patent Office 2,815,359
Patented Dec. 3, 1957

2,815,359

ALIPHATIC ESTERS OF 1-(p-SULFOPHENYL)-2-ACYLAMIDO-1,3-PROPANEDIOLS AND THEIR PREPARATION

Walter A. Gregory, Wilmington, Del., assignor to E. I. du Pont de Nemours and Company, Wilmington, Del., a corporation of Delaware No Drawing. Application October 6, 1953,
Serial No. 384,505

9 Claims. (Cl. 260—456)

This invention relates to aliphatic esters of 1-(p-sulfophenyl)-2-acylamido-1,3-propanediols and to a method for their preparation.

This application is a continuation-in-part of my copending application Serial No. 309,734 filed September 15, 1952, now abandoned.

The aliphatic esters of 1-(p-sulfophenyl)-2-acylamido-1,3-propanediols of my invention conform to the formula 1.

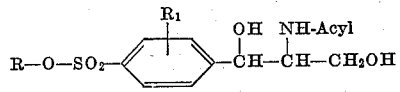

where R is a member of the group consisting of lower alkyl and allyl radicals, $R_1$ represents hydrogen, halogen, lower alkyl and lower alkoxyl radicals, and acyl represents an acetyl, chloroacetyl, bromoacetyl, dichloroacetyl or dibromoacetyl radical.

Radicals containing no more than 6 carbon atoms are referred to herein as lower radicals.

Included among the compounds represented by Formula 1, which are preferred, are those wherein $R_1$ is hydrogen and R is an alkyl radical having from 1 to 4 carbon atoms.

As illustrative of the compounds of the invention there may be mentioned:

1-(p-sulfophenyl) - 2 - (alpha,alpha-dichloroacetamido) 1,3-propanediol, methyl ester
1-(p-sulfophenyl) - 2 - (alpha,alpha-dichloroacetamido) 1,3-propanediol, ethyl ester
1-(p-sulfophenyl) - 2 - (alpha,alpha-dichloroacetamido) 1,3-propanediol, n-propyl ester
1-(p-sulfophenyl) - 2 - (alpha,alpha-dichloroacetamido) 1,3-propanediol, isopropyl ester
1-(p-sulfophenyl) - 2 - (alpha,alpha-dichloroacetamido) 1,3-propanediol, n-butyl ester
1-(p-sulfophenyl) - 2 - (alpha,alpha-dichloroacetamido) 1,3-propanediol, isobutyl ester
1-(p-sulfophenyl) - 2 - (alpha,alpha-dichloroacetamido) 1,3-propanediol, n-amyl ester
1-(p-sulfophenyl) - 2 - acetamido - 1,3 - propanediol, methyl ester
1-(p-sulfophenyl) - 2 - acetamido - 1,3 - propanediol, ethyl ester
1-(p-sulfophenyl) - 2 - acetamido - 1,3 - propanediol, n-propyl ester
1-(p-sulfophenyl) - 2 - acetamido - 1,3 - propanediol, isopropyl ester
1-(p-sulfophenyl) - 2 - acetamido - 1,3 - propanediol, n-butyl ester
1-(p-sulfophenyl) - 2 - acetamido - 1,3 - propanediol, isobutyl ester
1-(p-sulfophenyl) - 2 - acetamido - 1,3 - propanediol, n-hexyl ester
1-(p-sulfophenyl) - 2 - (alpha - chloroacetamido) - 1,3-propanediol, methyl ester
1-(p-sulfophenyl) - 2 - (alpha - chloroacetamido) - 1,3-propanediol, ethyl ester
1-(p-sulfophenyl) - 2 - (alpha - chloroacetamido) - 1,3-propanediol, n-propyl ester
1-(p-sulfophenyl) - 2 - (alpha - chloroacetamido) - 1,3-propanediol, isopropyl ester
1-(p-sulfophenyl) - 2 - (alpha - chloroacetamido) - 1,3-propanediol, n-butyl ester
1-(p-sulfophenyl) - 2 - (alpha - chloroacetamido) - 1,3-propanediol, isobutyl ester
1-(p-sulfophenyl) - 2 - (alpha - chloroacetamido) - 1,3-propanediol, n-amyl ester
1-(p-sulfophenyl) - 2 - (alpha - bromoacetamido) - 1,3-propanediol, methyl ester
1-(p-sulfophenyl) - 2 - (alpha - bromoacetamido) - 1,3-propanediol, ethyl ester
1-(p-sulfophenyl) - 2 - (alpha - bromoacetamido) - 1,3-propanediol, n-propyl ester
1-(p-sulfophenyl) - 2 - (alpha - bromoacetamido) - 1,3-propanediol, isopropyl ester
1-(p-sulfophenyl) - 2 - (alpha - bromoacetamido) - 1,3-propanediol, n-butyl ester
1-(p-sulfophenyl) - 2 - (alpha - bromoacetamido) - 1,3-propanediol, isobutyl ester
1-(p-sulfophenyl) - 2 - (alpha - bromoacetamido) - 1,3-propanediol, n-amyl ester
1-(p-sulfophenyl) - 2 - (alpha,alpha - dibromoacetamido) 1,3-propanediol, methyl ester
1-(2-methyl - 4 - sulfophenyl) - 2 - (alpha,alpha-dichloroacetamido)-1,3-propanediol, methyl ester
1-(2-methoxy-4-sulfophenyl) - 2 - (alpha,alpha-dichloroacetamido)-1,3-propanediol, methyl ester
1-(3-chloro - 4 - sulfophenyl) - 2 - (alpha,alpha-dichloroacetamido)-1,3-propanediol, methyl ester
1-(2-fluoro - 4 - sulfophenyl) - 2 - (alpha,alpha-dichloroacetamido)-1,3-propanediol, methyl ester
1-(p-sulfophenyl) - 2 - (alpha,alpha-dichloroacetamido) 1,3-propanediol, allyl ester The esters of 1-(p-sulfophenyl)-2-acylamidopropanediols of my invention can be prepared from previously known organic compounds by novel processes, the details of which are described hereinafter.

All of the compounds represented by Formula 1 may exist in optical isomeric form. Stereoisomeric forms as used herein refer to the spatial arrangement of the polar groups on the two asymmetric carbon atoms with reference to erythrose and threose. To differentiate between these two possible forms the convention will be employed herein which designates the diastereoisomeric pair related to erythrose in configuration as the erythro form, and the diastereoisomeric pair related to threose as the threo form.

To further designate the threo form of the compounds of this invention, I have designated as the threo form the major product obtained from the aluminum isopropoxide-isopropanol reduction of ketones having the formula 2.

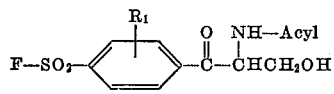

where $R_1$ and acyl have the same significance as in Formula 1.

Both the threo and erythro forms exists as race-mates of optically active dextro (d) and levo (l) rotatory isomers as well as in the form of an individual or separated dextro (d) and levo (l) optical isomers.

In view of the difficulty of representing the various optical isomers with plane formulas, I have used the customary structural formulas and adopted the following convention in order to designate the optical configuration, and appropriate notation is used under the formula, for example, (l)-threo form, (d)-threo form, (l)-erythro form, (d)-erythro form and (dl)-threo form and the like.

It will be understood that where no notation appears with a structural formula or with a chemical name, the formula or name is interpreted in its generic sense; that is, as representing the (d)-threo, (l)-threo isomers or (d)-erythro, (l)-erythro isomers in separated form as well as the (dl)-threo or (dl)-erythro optical isomers or the mixtures of all of the isomers and racemates. In other words, a formula or name represents not only the unresolved mixture of isomers but also the individual isomers and racemates.

The optical racemates can be resolved into the (d) and (l) components by conventional methods.

The process of the invention by which the aliphatic esters of 1-(p-sulfophenyl)-2-acylamido-1,3-propanediols are preferably prepared comprises reacting a 1-(p-fluorosulfonylphenyl)amido-1,3-propanediol of the formula

3.

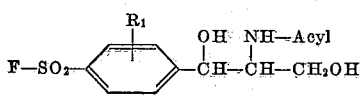

wherein $R_1$ and acyl have the same significance as in Formula 1 with a compound of the group consisting of alkali metal hydroxides, alkali metal alkoxides, and tertiary organic bases, in the presence of a substantially anhydrous lower aliphatic alcohol.

The compounds of Formula 3 and their preparation are fully described and claimed in United States Patent No. 2,680,134. In brief, the compounds represented by Formula 3, which are the starting materials for my present invention, are prepared by oxidizing a compound of the formula

4.

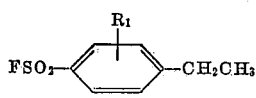

with $KMnO_4$ in aqueous $Mg(NO_3)_2$, and subjecting the resulting compounds to the steps of halogenation, treatment with hexamethylenetetramine, subsequent treatment with sulfurous acid, hydrolysis, acetylation, aldol-type of condensation using $NaHCO_3$ and aqueous formaldehyde, and reduction using $NaH_4B$ or aluminum isopropoxide in isopropyl alcohol.

The alkyl portion of the alcohol employed in preparing the esters should correspond in carbon content and structure to the organic portion of the alkoxide. In other words, absolute ethanol is used with sodium ethoxide, methanol with potassium methoxide, isopropanol with potassium isopropoxide.

Of the alkali metal hydroxides and alkoxides I prefer potassium hydroxide.

Any of a wide variety of tertiary bases may be employed in my novel process. There may be used, for example, trimethylamine, triethylamine, pyridine and N-methyl-morpholine.

It is preferred to employ an excess of the alcohol over that required to form the ester. Substantially equivalent quantities of the fluorosulfonylphenylamido-1,3-propanediol and the alkali metal hydroxide or alkoxide are generally employed.

The reaction between the compound of Formula 3 and the alkali metal alkoxide or hydroxide in the presence of the appropriate alcohol is exothermic. It is preferred to carry out the reaction at a temperature of about 30° C. or less, particularly if the amido group of the compound represented by Formula 3 is substituted. In any event the temperature of the reaction mixture should be kept below the temperature at which the acetamido linkage is hydrolyzed.

The compounds of the present invention are useful as drugs for the control of bacteria and rickettsial infections. The compounds are also useful as anti-bacterial agents and for the control of growth of micro-organisms such as yeast and fungi.

In order to better understand the invention, reference should be had to the following illustrative examples:

Example 1

Preparation of (dl)-threo-1-(p-sulfophenyl)-2-(alpha,-alpha-dichloroacetamido)-1,3-propanediol, methyl ester

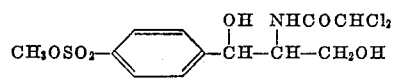

A mixture consisting of 100 g. of (dl)-threo-1-(p-fluorosulfonylphenyl)-2-(alpha,alpha-dichloroacetamido)-1,3-propanediol, prepared by the method described in United States Patent No. 2,680,134, and 500 cc. of methanol is stirred as a solution of 16.8 g. of potassium hydroxide in 100 cc. of methanol is added thereto. The temperature of the reaction mixture is kept below 30° C. The reaction is exothermic and cooling is required.

A bright yellow color develops in the solution as the base is added, and this fades with the elapse of time.

After the addition of the base is complete, the reaction is allowed to continue for a period of about 15 minutes. The desired product is isolated by distilling the methanol under reduced pressure and adding water. The (dl) threo-1-(p-sulfophenyl)-2-(alpha,alpha-dichloroacetamido-1,3-propanediol separates as white crystals, which are collected. They may be purified by crystallization from acetonitrile. The crystalline product melts at 154–155° C.

Analysis calculated for $C_{12}H_{15}Cl_2NO_6S$: Cl, 19.05; S, 8.61. Found: Cl, 18.77; S, 8.52.

Example 2

Preparation of (dl)-threo-1-(p-sulfophenyl)-2-(alpha,-alpha-dichloroacetamido)-1,3-propanediol, ethyl ester.

A suspension of 36 g. of (dl)-threo-1-(p-fluorosulfonylphenyl) - 2-(alpha,alpha-dichloroacetamido)-1,3-propanediol (obtained as indicated in Example 1) in 100 cc. of absolute ethanol is stirred at a temperature of about 25° C. as a solution of 5.6 g. of potassium hydroxide in 50 cc. of absolute ethanol is slowly added. During the addition of the potassium hydroxide-ethanol solution, the temperature of the reaction mixture is kept below 30° C.

The reaction mixture is stirred for a period of about 30 minutes. The desired ester is obtained by diluting the solution with water and cooling the diluted solution. The product separates as white crystalline material and is collected. It has the structure

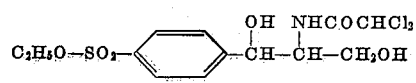

Example 3

Preparation of (dl)-threo-1-(p-sulfophenyl)-2-acetamido-1,3-propanediol, methyl ester.

To a stirred mixture of 29 g. of (dl)-threo-1-(p-fluorosulfonylphenyl)-2-acetamido-1,3-propanediol, prepared by the method described in United States Patent No. 2,680,134, in 75 cc. of methyl alcohol there is added a solution of 5.4 g. of sodium methoxide in 50 cc. of methanol. The reaction mixture is maintained at a temperature below 30° C. by means of external cooling.

After the addition is complete, the reaction mixture is allowed to stand for a period of about 30 minutes. The methanol is removed from the reaction system by distillation under reduced pressure. The desired ester crystallizes from the methanol-free mixture when water is added to the latter and the aqueous system stirred. The resulting white crystals are collected. They have the following structure;

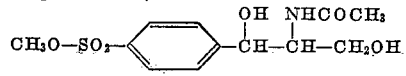

Example 4

Preparation of (dl)-threo-1-(2-methyl-4-sulfophenyl)-2-(alpha,alpha-dichloroacetamido) - 1,3-propanediol, isopropyl ester.

To a stirred mixture consisting of 37.4 g. of (*dl*)-threo-1-(4-fluorosulfonyl-2-methylphenyl)-2-(alpha,alpha-dichloroacetamido)-1,3-propanediol, prepared by the method described in United States Patent No. 2,680,134, and 100 cc. of isopropyl alcohol there is added 5.6 g. of powdered potassium hydroxide. The temperature of the reaction mixture is kept below 30° C. during the addition.

The reaction mixture is allowed to stir for a period of about one hour after the addition is completed.

The desired product is isolated from the reaction system by removing the excess alcohol under reduced pressure and triturating the residue in water until the product crystallizes. The product is a white crystalline solid. It can be represented by the structural formula

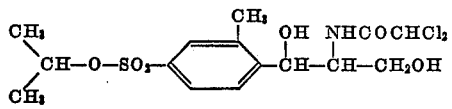

I claim:

1. A compound of the formula

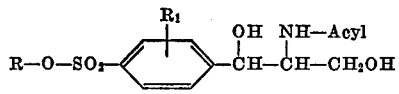

where R is a member of the group consisting of lower alkyl and allyl radicals, $R_1$ is a member of the class consisting of hydrogen, halogen, lower alkyl and lower alkoxy radicals, and acyl is a member of the group consisting of acetyl, chloroacetyl, bromoacetyl, dichloroacetyl and dibromoacetyl radicals.

2. (*dl*) - threo - 1 - (p - sulfophenyl) - 2 - (alpha,alpha-dichloroacetamido)-1,3-propanediol, methyl ester.

3. (*dl*) - threo - 1 -(p - sulfophenyl) - 2 - (alpha,alpha-dichloroacetamido)-1,3-propanediol, ethyl ester.

4. (*dl*) - threo - 1 - (p - sulfophenyl) - 2 - (alpha,alpha-dichloroacetamido)-1,3-propanediol, propyl ester.

5. (*dl*) - threo - 1 - (p - sulfophenyl) - 2 - (alpha, alpha-dichloroacetamido)-1,3-propanediol, isopropyl ester.

6. (*dl*) - threo - 1 -(p - sulfophenyl) - 2 - alpha,alpha, dichloroacetamido)-1,3-propanediol, n-butyl ester.

7. A process which comprises reacting a compound having the formula

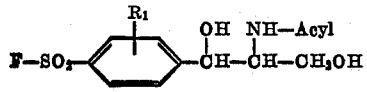

where, $R_1$ is a member of the group consisting of hydrogen, halogen, lower alkyl and lower alkoxy radicals, acyl is selected from the group consisting of acetyl, chloroacetyl, bromoacetyl, dichloroacetyl and dibromoacetyl radicals, with a basic compound selected from the group consisting of alkali metal hydroxides, basic tertiary amines and alkali metal alkoxides of the formula ROM where R is an organic radical selected from the group consisting of lower alkyl and allyl radicals and M is an alkali metal, in presence of an anhydrous alcohol of the formula ROH where R has the same significance as above and corresponds to the selected organic radical of the alkoxide, provided an alkoxide is used, the temperature of the reaction mixture being kept below the temperature at which the acetamido linkage is hydrolyzed, to produce a compound of the formula

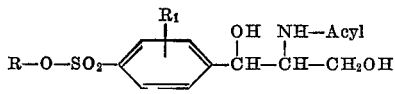

where R, $R_1$, and acyl have the same significance as above.

8. In a process for preparing a lower alkyl ester of (*dl*) -threo - 1 - (p - sulfophenyl) - 2 - (alpha,alpha-dichloroacetamido)-1,3-propanediol, the step comprising reacting (*dl*)-threo-1-(p-fluorosulfonylphenyl)-2-(alpha, alpha-dichloroacetamido)-1,3-propanediol with an alkali metal hydroxide in the presence of an anhydrous alcohol having not more than 4 carbon atoms at a temperature not exceeding about 30° C.

9. In a process for preparing the methyl ester of (*dl*)-threo - 1 - (p - sulfophenyl) - 2 - (alpha,alpha-dichloroacetamido)-1,3-propanediol, the step comprising reacting (*dl*) - threo - 1 - (p - fluorosulfonylphenyl) - 2 - (alpha, alpha-dichloroacetamido)-1,3-propanediol with potassium methoxide in the presence of absolute methanol at a temperature of about 30° C.

References Cited in the file of this patent

UNITED STATES PATENTS 2,483,884    Crooks et al. _____ Oct. 4, 1949

OTHER REFERENCES

Cutler et al.: J. A. C. S., vol. 74, p. 5475 (November 1952), received for publication June 2, 1952.